US008867988B2

(12) United States Patent
Jolivet et al.

(10) Patent No.: US 8,867,988 B2
(45) Date of Patent: Oct. 21, 2014

(54) PERFORMING CONTACTLESS APPLICATIONS IN BATTERY OFF MODE

(75) Inventors: Paul Jolivet, Paris (FR); Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 1003 days.

(21) Appl. No.: 12/531,449

(22) PCT Filed: Feb. 4, 2008

(86) PCT No.: PCT/KR2008/000692
§ 371 (c)(1),
(2), (4) Date: Sep. 15, 2009

(87) PCT Pub. No.: WO2008/114931
PCT Pub. Date: Sep. 25, 2008

(65) Prior Publication Data
US 2010/0029202 A1  Feb. 4, 2010

Related U.S. Application Data

(60) Provisional application No. 60/895,343, filed on May 16, 2007.

(51) Int. Cl.
*H04B 5/00* (2006.01)
*G06K 7/00* (2006.01)
*H02J 5/00* (2006.01)
*G06K 7/10* (2006.01)

(52) U.S. Cl.
CPC ............... *G06K 7/0008* (2013.01); *H02J 5/005* (2013.01); *G06K 7/10297* (2013.01)
USPC ........................................ 455/41.1

(58) Field of Classification Search
CPC .................... H04L 9/3234; G03G 2215/00067
See application file for complete search history.

(56) References Cited

U.S. PATENT DOCUMENTS

| | | | | |
|---|---|---|---|---|
| 5,994,879 A | * | 11/1999 | Hsieh | 320/134 |
| 6,710,578 B1 | * | 3/2004 | Sklovsky | 320/127 |
| 2002/0156683 A1 | * | 10/2002 | Stoutenburg et al. | 705/16 |
| 2004/0030601 A1 | * | 2/2004 | Pond et al. | 705/16 |
| 2004/0090930 A1 | * | 5/2004 | Lee et al. | 370/328 |
| 2004/0230488 A1 | * | 11/2004 | Beenau et al. | 705/18 |
| 2005/0017068 A1 | * | 1/2005 | Zalewski et al. | 235/380 |
| 2005/0128963 A1 | * | 6/2005 | Gazda et al. | 370/278 |
| 2005/0164748 A1 | | 7/2005 | Kitaji | |
| 2005/0250531 A1 | * | 11/2005 | Takebe et al. | 455/550.1 |
| 2006/0118622 A1 | | 6/2006 | Zatloukal et al. | |

(Continued)

FOREIGN PATENT DOCUMENTS

JP          2003-9203 A       1/2003
KR   10-2005-0120746 A      12/2005

*Primary Examiner* — Yuwen Pan
*Assistant Examiner* — Ayodeji Ayotunde
(74) *Attorney, Agent, or Firm* — Birch, Stewart, Kolasch & Birch, LLP

(57) ABSTRACT

Contactless services, applications, and/or transactions can be performed between a mobile terminal and a contactless reader even when the mobile terminal battery power is found to be insufficient or if there is some other problem with the battery. Current is induced from electromagnetic (EM) fields or radio frequency (RF) signals detected near the mobile terminal such that sufficient power can be momentarily and/or temporarily used to access information from a smart card or other components within the mobile terminal, and allow user interaction via the contactless reader.

16 Claims, 4 Drawing Sheets

(56) References Cited

U.S. PATENT DOCUMENTS

| | | | |
|---|---|---|---|
| 2006/0202665 A1* | 9/2006 | Hsu | 320/139 |
| 2006/0223582 A1 | 10/2006 | Simola | |
| 2007/0004461 A1* | 1/2007 | Bathina et al. | 455/566 |
| 2007/0145830 A1* | 6/2007 | Lee et al. | 307/135 |
| 2009/0319777 A1* | 12/2009 | Skemer | 713/155 |

* cited by examiner

PERFORMING CONTACTLESS APPLICATIONS IN BATTERY OFF MODE

This application is the National Phase of PCT/KR2008/000692 filed on Feb. 4, 2008, which claims priority under 35 U.S.C. 119(e) to U.S. Provisional Application No. 60/895,343 filed on May 16, 2007, all of which are hereby expressly incorporated by reference into the present application.

TECHNICAL FIELD

The present invention relates to performing contactless applications in battery off mode.

BACKGROUND ART

The background art technologies related to mobile terminals do not sufficiently address the issues related to performing contactless applications in battery off mode, and thus do not offer appropriate solutions.

DISCLOSURE OF INVENTION

Technical Solution

The present inventors recognized some drawbacks of the background art. Based upon such recognition, the various features described hereafter have been conceived such that contactless applications in battery off mode can be performed.

If the mobile terminal battery power is found to be insufficient (i.e., battery power is relatively low, battery off mode), current is induced from electromagnetic (EM) fields or from radio frequency (RF) signals detected near the mobile terminal such that sufficient power can be momentarily used to access information from a smart card or other components within the mobile terminal. Thus, user interaction via the contactless reader to perform a contactless service, application, and/or transaction can be achieved.

MODE OF THE INVENTION

Figure 1:
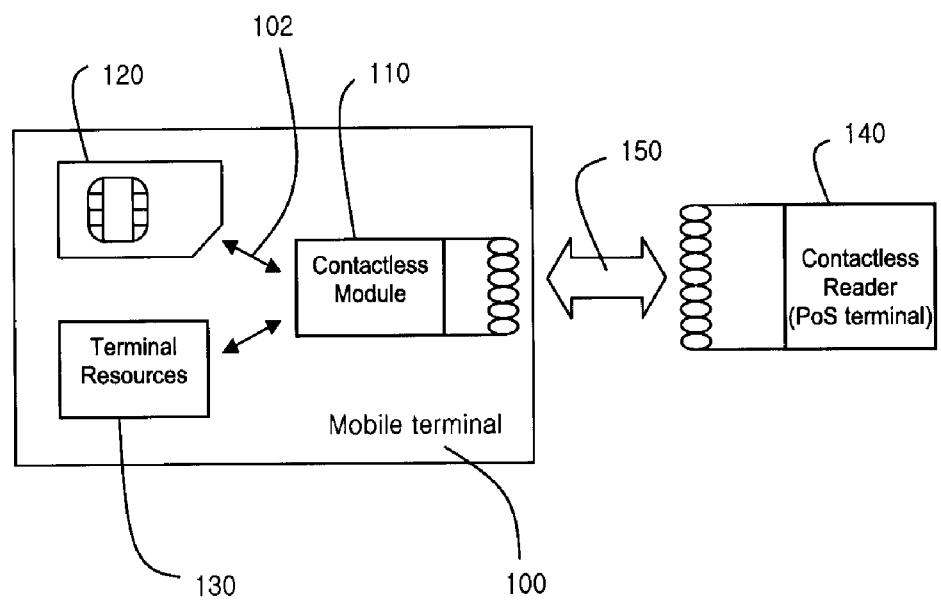
FIG. 1 shows an example of how a mobile terminal and a contactless reader can cooperate with each other.

The present disclosure claims priority benefit to U.S. Provisional Application No. 60/895,343 (filed Mar. 16, 2007), which contents are all incorporated by reference herein.

The inventive concepts and features described herein that are related to contactless application selection on UICC in battery off mode will be explained in terms of implementation for a user terminal, such as a mobile phone. However, such details are not meant to limit the various features described herein, which are applicable to other types of devices.

Hereafter, the term "terminal" will be used to refer to various types of user devices, such as mobile communication terminals, user equipment (UE), mobile equipment (ME), and other devices that support various types of wireless communication technologies.

The definitions of some other terms used herein are provided as follows:

ISO: International Standard Organisation.
ETSI: European Telecommunication Standard Institute (in charge of UICC specification).
UICC: Smart card platform supporting SIM, USIM (etc.) applications.
USIM: UICC application including parameters and tools to identify and authenticate a 3G/UMTS user and to run its applications as specified by 3GPP.
SIM: UICC application including parameters and tools to identify and authenticate a GSM user and to run its applications as specified by 3GPP.
SWP: Single Wire Protocol.
CLF: ContactLess Function (module).
MMC: MultiMedia Card as defined by the MMC Association (By extension, the protocol can be defined on the card/reader interface).
USB: Universal Serial Bus as defined by the USB Implementers' Forum (By extension, the protocol can be defined on the card/reader interface).

The present invention relates to contactless application selection on UICC in battery off mode for a mobile terminal or the like.

It should be noted that mobile terminals under development (or to be developed in the near future) may have multiple card slots to receive more than one removable module (that could be a smart card, a SD card, etc.). Also, the contactless function module (CLF) itself may removable by being implemented on a smart card or the like.

As the concepts and aspects described herein are applicable to smart cards (or other types of storage media and memories), various standards that are related to and support such smart card technologies (such as ISO/IEC, ETSI, GSM, 3GPP, 3GPP2, OMA, IEEE, etc.) are also part of the exemplary embodiments described herein. It can be understood that the above exemplary standards are not intended to be limiting, as other related standards and technologies would also be applicable to the various features and concepts described herein.

For example, a smart card can be considered to have a basic platform and various applications related thereto. The standardization to support the basic platform is handled by the ETSI, while the various applications running on the platform are handled by different standard organizations. For example, the USIM and SIM features are handled by the 3GPP, the R-UIM features is handled by the 3GPP2, certain financial applications are handled by EMV (Europay™, MasterCard™, Visa™), and the like.

A smart card (also referred to as a chip card, an integrated circuit card (ICC) or the like) is defined as any pocket-sized card with embedded integrated circuits that can process information. Various ICC applications can be used to receive inputs, perform processing thereon, and deliver outputs. There are two types of ICCs, namely memory cards and microprocessor cards. Memory cards contain non-volatile memory storage components, and some logic circuitry for security. Microprocessor cards contain volatile memory and microprocessor components. Such cards may be made of plastic or some other appropriate material and may have an embedded hologram or other security device to avoid counterfeiting.

Smart cards may be categorized as having a contact interface, a contactless interface, or both. These smart cards typically do not have their own battery or power source.

A contact-type smart card has a stamp (typically made of gold) that makes physical contact with electrical connectors of a smart card reader upon insertion of the smart card, such that information can be read from and written to the chip.

A contactless-type smart card communicates with a card reader through radio frequency identification (RFID) technology. Such contactless-type smart cards may also use near field communication (NFC), which is a short-range wireless communication technology that allows data exchanging between devices over a relatively short distance. NFC technology is based on RFID, which makes it compatible with the existing contactless infrastructure already in use for public transportation and payment applications. Also, in a contactless-type smart card, an inductor element can be used to capture and rectify incident RF signals in order to power the integrated circuits in the smart card.

A dual-interface card, namely, a smart card implemented with contactless and contact interfaces, may use shared storage and processing.

The term "contactless" may be used in reference to certain technologies, such as a contactless smart card, a proximity card, contactless payment, radio-frequency identification (RFID), near field communication (NFC), and the like.

The current standard for contactless smart card communications is ISO/IEC 14443 that defines two types of contactless cards (Types A and B) and allows for contactless communications at a distance of up to about 10 centimeters.

To provide enhanced services and applications, more and more terminals will implement to so-called contactless features. Such enhanced services can support transportation applications (e.g., fare payments for riding the subway, metro, buses, etc.), e-purses (e.g., electronic financial transactions, e-banking, etc.), and the like.

The principle of the contactless feature is that a relatively low range medium is used between the terminal and a reader (for instance, a metro/subway turnstile or gate) to execute a fee transaction, to identify the user, or to perform some other type of function or application.

For security and service management reasons, it is likely that the UICC (the telecommunication smart card supporting SIM/USIM) will manage at least part of the contactless services/applications, therefore implementations must consider a physical or logical interface with the UICC.

For technical reasons (such as, electromagnetic constraints (EMC), antenna implementation, etc.), it is impossible (or at least very difficult) to implement all (or the desired or necessary) contactless features in the smart card (UICC). At least part of such features shall be supported in a contactless function module (i.e., a functional entity implemented in hardware, software, or a combination thereof to support contactless services and/or applications), which is part of the terminal.

To provide enhanced services and applications, more and more terminals (mobile phones) and smart cards (UICCs) will implement contactless features. The applications themselves can be based on the UICC. This intention is to merge existing contactless services (e.g., transportation, payment, etc.) into the mobile phone. In order to have at least the same level of services than a separate card, the battery off mode shall be considered. This is considered to be needed in transportation services, as it would be unacceptable for a user to be unable to enter a train station just because his mobile phone has no battery power.

Financial organisations require users to make application selections within the area of payment. For making such payments, several applications will coexist and the user will have to choose a desired application the same way that he would choose among one of his credit cards when paying. The easiest way to do so, is to allow the user to interact with a user interface (such as the display and keyboard) of the mobile terminal. However, this means that use of such payment services is limited to only when the mobile terminal has enough battery power to operate such user interface.

The principle of this invention is to propose solutions with a Point-of-Sale (PoS) reader and user interaction such that a financial transaction (or other contactless service) with application selection can be realized. This is based on several mechanisms, including various interactions with the Point-of-Sale (PoS) terminal and priority mechanisms. The overall invention proposal is based on the assumption of the use of contactless services when the battery is off (or too low to power the terminal) and offer appropriate interactions with the user.

FIG. 1 shows an example of how a mobile terminal and a contactless reader can cooperate with each other. The mobile terminal 100 has a contactless module 110 that interacts with a smart card 120 and with various terminal resources 130. When the mobile terminal 100 is placed at or near a contactless reader 140, wireless communications can be performed with the contactless module 110 via a wireless (or contactless) interface 150.

As an example of a smart card 120, the UICC is a smart card platform that supports various telecommunication applications, such as SIM (for GSM) or USIM (for 3G). The UICC can also support other types of applications including transportation application based on the contactless interface. The UICC is the evolution of the GSM SIM card that was only able to run a SIM application.

The UICC continues to evolve with respect to two aspects; 1) employing a large memory and high-speed interface, and 2) supporting contactless services.

A large memory and high-speed interface allow the UICC to support more applications, personal data of the user, certificate procedures, etc. without having trouble in transferring large amounts of data within a reasonable timeframe.

Contactless services address the market of integrating access control services, transportation passes, and the like into the mobile terminal. The UICC would be used in such cases to secure information and applications, whereas for reasons detailed below, most of the actual contactless link management (modulation, power control and management, etc.) would be made in the mobile terminal.

The principle of the contactless interface applied to UICC is that the UICC will pilot (or provide control for) a separate terminal based module that will manage the contactless transaction. This is likely to be piloted by the UICC for security reasons, because the (system) operator and 3rd party provider usually would prefer the UICC over the terminal.

However in some cases, the contactless module may directly interact with the terminal, for instance when a direct interaction with the user is required.

In operation, the UICC and contactless module can either be powered by the mobile terminal battery or by current induced by the electromagnetic fields (EMF) (or radio frequency (RF) signals) provided from the contactless reader. Induced current from EMF or RF signals can be typically used for battery off mode.

The typical use cases for contactless service include (but are not limited to) transportation, loyalty and financial applications, (including e-purse, debit and credit cards), and the like.

Figure 2:
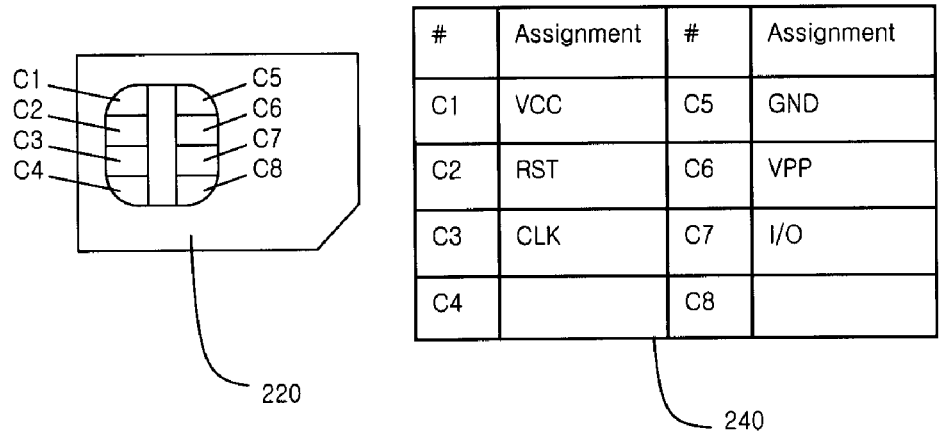
FIG. 2 shows an example of a smart card (UICC) 220 having a particular allocation for eight (8) physical contacts, as indicated by the chart 240.

FIG. 2 shows an example of a smart card (UICC) 220 having a particular allocation for eight (8) physical contacts, as indicated by the chart 240.

Although it can be understood that the features of the present invention can also be adapted and implemented to smart cards with a different number of physical contacts, the exemplary embodiments will focus on an 8-contact type UICC.

The physical interface between the UICC and mobile terminal can be based on an 8-contact module. It is currently unlikely that more contacts can be implemented in the future. Therefore, all extensions have to be considered based on the existing contacts, and minimum backward compatibility requirements, such that a session can be always opened on the ISO T=0 protocol, as defined in the ISO 7816 series.

Therefore, only 3 contacts are remaining for further development. Currently, 2 contact candidates are considered for a High-Speed interface between the UICC and the terminal. Additionally, Multimedia card (MMC) applications can be implemented by using the C4/C6/C8 contacts, and USB can be implemented by using the C4/C8 contacts. It may be likely that the interface with the contactless module in the terminal is likely to be specified based on the Single Wired Protocol (SWP), using contact C6.

The service should be at least as easy to use for the end user as if he was to use his card. Therefore, a transportation pass service implies the possible use in case the terminal battery power is too low or empty. It is unacceptable for the user and service provider that a user cannot enter a metro station because his terminal has low power.

Figure 3:
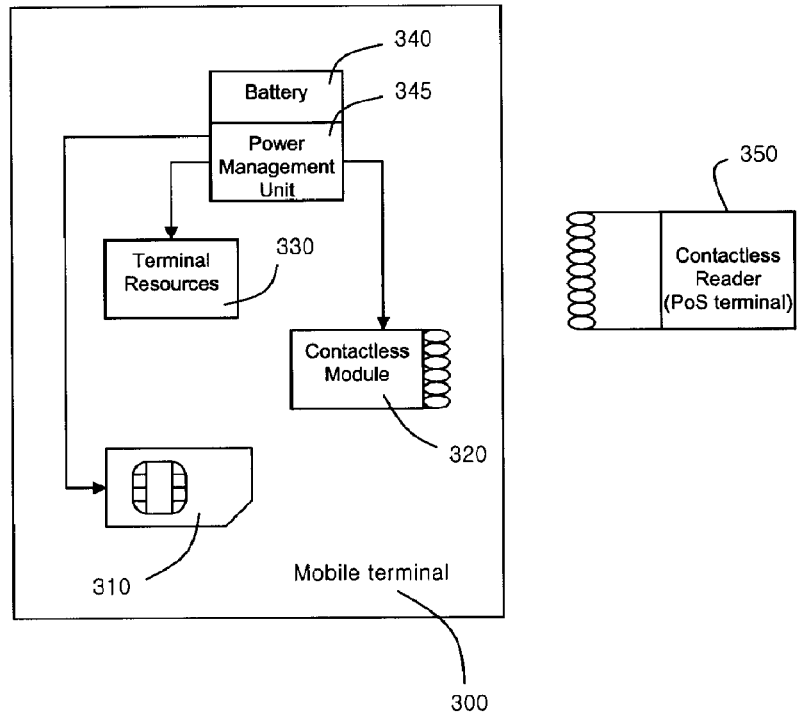
FIG. 3 shows an example of how a secure element (smart card) and a contactless module are powered in a mobile terminal via a battery.

FIG. 3 shows an example of how a secure element (smart card) and a contactless module are powered in a mobile terminal via a battery A mobile terminal 300 and a contactless reader 350 can cooperate through near-field communications (NFC) or other close-range wireless (contactless) technology to carry out a contactless application or function, such as a financial transaction, a transportation pass, user identification, or the like.

The mobile terminal 300 may include a secure element 310 (such as, a smart card, a UICC, etc.) and a contactless module 320 (such as, a contactless function module (CLF), etc.), which can communicate (i.e., exchange data and information) with each other (and with other components in the mobile terminal 300) via a communication medium or interface (wired or wireless). Such communication medium can support the exchange of protocol commands and instructions (such as those specified by the ISO or some wireless protocol standard).

As explained previously, the contactless hardware is independent from the UICC, although it could interact with the module through the terminal communication bus and logical links. Note that although FIG. 3 relates to a terminal in a contactless card emulation mode, it also applies when the mobile contactless function is used as a reader.

As shown in FIG. 3, in the normal mode (i.e. power is supplied by the mobile handset), the secure element 310 (UICC) and the contactless module 320 are powered by the terminal via a battery 340 (or other power source). A power management unit 345 (or other power control means) performs the appropriate power control to access and/or operate the secure element 310, the contactless module 320, and other terminal resources 330. This allows use of all or most functionalities of the terminal.

When considering the case of the battery off mode (e.g., the terminal is switched off, the battery is empty, etc.), some services should still be served, for instance, an access pass function for transportation applications. The so-called Single Wire Protocol (SWP) is one type of contactless technology proposal that considers the battery off mode situation and employs current induction techniques. However, working in the battery off mode is a strong requirement that is requested from mobile communication system operators. In this mode, the terminal resources cannot be sufficiently used, because the induced current is usually too low (i.e., not strong enough) to enable a plurality of terminal functions, and if enablement is possible, the quality of service (QoS) requirements cannot be fully satisfied.

Figure 4:
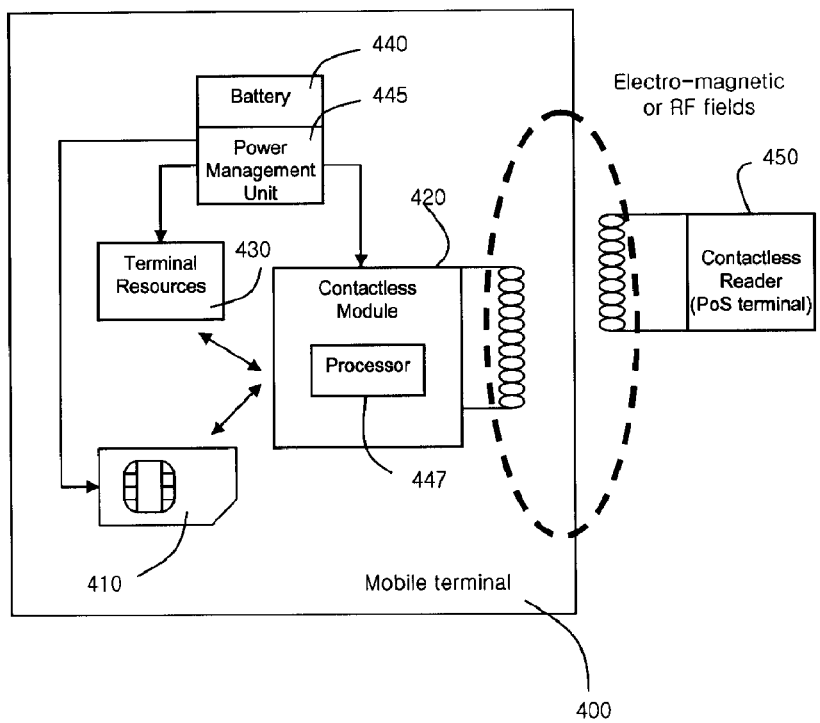
FIG. 4 shows an example of how a secure element (smart card) and a contactless module in a mobile terminal are temporarily powered by induced current from electromagnetic fields near the mobile terminal.

FIG. 4 shows an example of how a secure element (smart card) and a contactless module are powered in a mobile terminal via contactless recharging due to induced current from electromagnetic fields near the mobile terminal.

Similar to FIG. 3, the secure element 410 (UICC) and the contactless module 420 are normally powered by the terminal via a battery 440 (or other power source). A power management unit 445 (or other power control means) performs the appropriate power control to access and/or operate the secure element 410, the contactless module 420, and other terminal resources 430.

When the terminal is in an area (or region) having a strong enough electromagnetic field (which does not correspond to or interfere with a contactless transaction to be initiated), the terminal uses the field to create an induced current to be used for accessing the secure element 410 (smart card, UICC, etc.). This can be based on an automatic detection as well as through user interaction.

In the reader mode, certain implementations are based on electromagnetic field generation of up to about 3 W.

A processor 447 (or some equivalent hardware device) may be employed. Such processor 447 may part of the contactless module 420 itself or may be a separate (dedicated) element. Here, the processor 447 may have a detector (or the like) detect the presence of electromagnetic fields near the mobile terminal, and may have a generator (or the like) to generate an induced current from the detected electromagnetic fields.

The power inducted from the reader (i.e., PoS terminal) shall then allow enabling of the service.

In the case of the payment systems, currently only the case of powered terminal have been considered as the assumption is that the user will have to select its application and interact with the terminal (for instance selecting the type of credit card and then accepting the transaction).

This proposal opens the possibility to allow application selection even though the battery of the terminal is empty or too low.

The invention is based on the use of the Point of Sale (PoS) terminal and a priority system on the UICC to enable application selection and transaction. This is based on application discovery and priority lists.

As an assumption in this invention, at the moment of a contactless transaction, the mobile is not powered (battery empty) and therefore the user unable to interact through his terminal to selection options or validate the transaction.

Although the examples given herein are based on payment transactions, one or more service providers, for instance: (1) payments (using credit card or the like), (2) access to/purchase of user content (music downloads, etc.), (3) loyalty (membership points, airline mileage, etc.), and the like.

Figure 5:
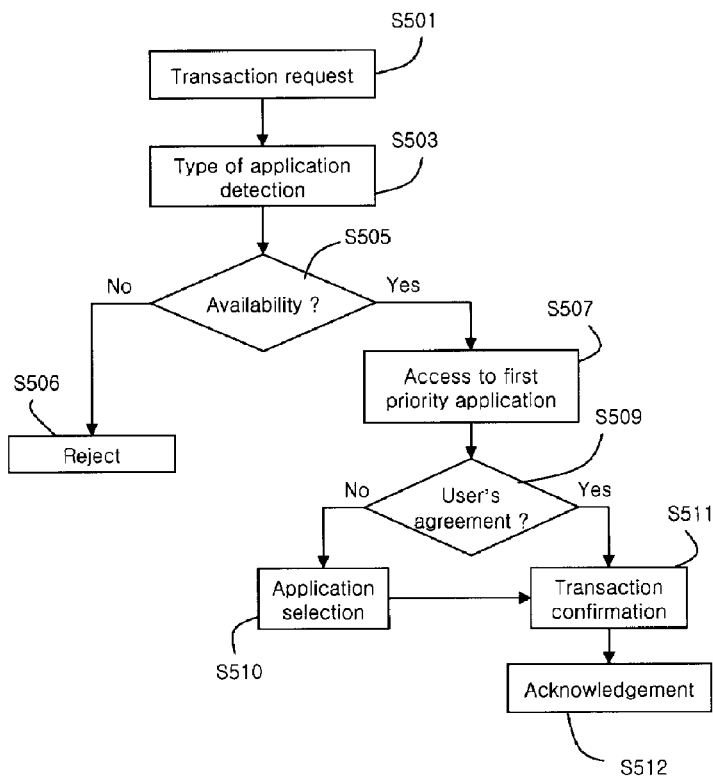
FIG. 5 is a flow chart showing some general principles of the invention when battery power is insufficient (battery off mode).
Figure 6:
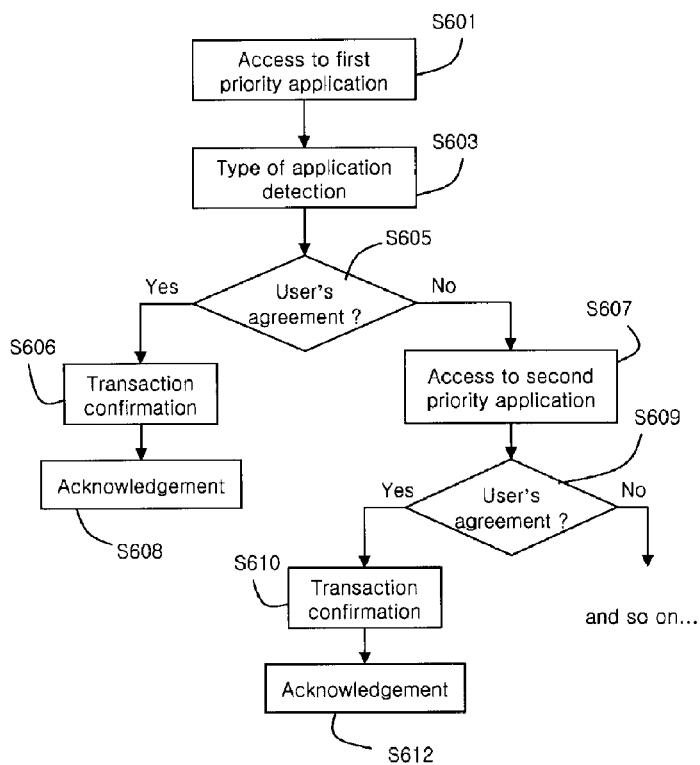
FIG. 6 is a flow chart showing some other general principles of the invention when battery power is insufficient (battery off mode).
Figure 7:
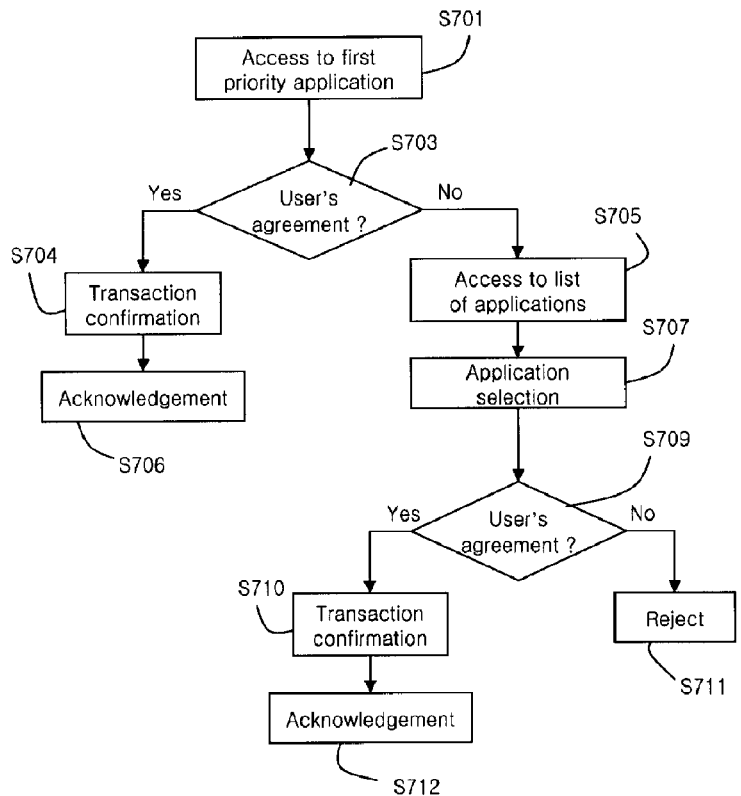
FIG. 7 is a flow chart showing additional general principles of the invention when battery power is insufficient (battery off mode).

FIGS. 5 through 7 show some general principles of the invention in the context of battery off mode for the terminal. In more detail, the invention is based on at least four principles that can either be used separately or combined in various ways. Here, it can be understood that various components within the terminal (such as those shown in FIG. 4, like a smart card 410, terminal resources 430, a contactless module 420, a processor 447 being part of or separate from the contactless module, etc.) can cooperate to performed the various steps and procedures outlines in FIGS. 5 through 7.

FIG. 5 is a flowchart of the first principle being based on the type of service (i.e., contactless application). Upon a transaction request (S501), the type of application is detected (S503). Then, the availability of the detected application is checked (S505). If not available, the transaction is simply rejected (S506). On the other hand, if the detected application is available, access to a first priority application is performed (S507). The, the user's agreement is verified (S509). If there is user agreement, the transaction is confirmed (S511) and an acknowledgement is made (S512). On the other hand, if there is no user agreement, application selection is performed (S510) and then transaction confirmation (S511) and acknowledgement (S512) are performed.

As a first approach to enable the access to a service that can be enabled by several applications (e.g. payment service enable a particular type of credit card), the applications should be sorted in a kind of database and identified in a specified list that may be called "Type of Service". Thus, when a transaction is opened, the UICC is able to give through the reader, information related to the availability of the service, without precluding as a first stage which application will be used and if the transaction can finally be concluded. Each application can enter in several types of service. For instance, a first credit card application can be related to one or more of an application (or transaction) for a credit card, an e-purse, a debit card type of service and the like. For interoperability reasons, the Type of Service to be specified does not limit the number of applications that can be implemented to enable the service itself. For the implementation of this first principle, a database scheme (or other similar means) would significantly ease the search and execution speed of the transaction.

FIG. 6 is a flowchart of the second principle being based on priorities of the applications (i.e., contactless service). The access to a first priority application is performed (S601), and the type of application is detected (S603). The, the user's agreement to such application is verified (S605). If the user agrees, the transaction is confirmed (S606) and acknowledgement is made (S608). However, if the user does not agree, the access to a second priority application is performed (S607). Thereafter, the user's agreement is verified again (S609). If verified, transaction confirmation (S610) and acknowledgement (S612) are performed. In such manner, these procedures may be repeated as necessary.

To simplify the transaction, a priority list within the Type of Service may be employed. The principle is that as a first option, the user can just accept the transaction on his preferred application (for instance paying by default on his credit card). The user's agreement is entered by the user via the Point of Sale terminal and provided through the contactless interface to the smart card (UICC). There can be two options in providing the priority list. Namely, either the user can update the priority list (putting a specific credit card on top of the other cards that can be used for payment) or such may be provided by the operator and/or service provider. As an extension of this principle, several options can be presented to the user in a certain priority order. This can be even set by parameters that may limit the maximum number of attempts for the transaction.

FIG. 7 is a flowchart of the third principle being based on application selection. Access to a first priority application may be performed (S701), and then the user's agreement is checked (S703). If the user agrees, the transaction is confirmed (S704) and acknowledgement is made (S706). If the user does not agree, access to a list of applications is made (S705), and an application is selected (S707). Then, the user's agreement can again be verified (S709). If the user agrees, the transaction is confirmed (S710) and acknowledgement is made (S712). If not, the transaction is rejected (S711).

This third principle provides the possibility to access, via a contactless reader willing to make a transaction (i.e., a PoS terminal), to a list of applications enabling a specific service (by means of using the Type of Service indicator, as defined above). This list of applications can be displayed on the contactless reader (the Point of Sale terminal in the case of a payment service). The user can thus select his preferred application and make the transaction using the selected application. Note that the transaction can be protected by a PIN code (or some other authentication scheme, such as, biometrics or the like) which verification can be done in battery off mode through the contactless interface.

Referring back to FIGS. 5 through 7, it can be understood that a fourth principle is based on the end of transaction.

At the end of the transaction, an acknowledgement is provided by the reader (Point of Sale terminal) to the smart card (UICC). This is indicated in steps S512 (FIG. 5), S608, S612 (FIG. 6) and S706, S712 (FIG. 7). This information is queued in the UICC and displayed as soon as possible. This feature can be set by parameters, and the information may be displayed: (1) as soon as the terminal is switched on, (2) at the next use of the application, (3) at the user's request, or at some other specific time.

To illustrate further, two use cases will be explained below.

In case 1, assume that the user is willing to pay for a transaction in a shop with his mobile phone (having low or no battery power) instead of using a credit card itself. The point of sale terminal (reader), after having checked the UICC through the contactless interface, can display the information that the first payment application available is a particular type of credit card for the user. The user can then validate the transaction via inputting on the point of sale reader. The acknowledgement is recorded on the UICC and will be displayed at the next use (i.e., transaction) of the terminal.

In case 2, again, it is assumed that the user is willing to pay for a transaction in a shop with his mobile phone (having low or no battery power) instead of using a credit card itself. The point of sale terminal (reader), after having checked the UICC through the contactless interface, can display the information that the first payment application available is a particular type of credit card for the user. However, unlike in case 1, the user may want to use another payment application (i.e., a different type of credit card is to be used). Then, the point of sale reader performs another access to the UICC to get the list of available payment applications, and displays them on the point of sale terminal screen. The user can now choose a different credit card, bank account, or the like to pay for the transaction.

The user validates the transaction on the point of sale reader, and the acknowledgement is recorded on the UICC and will be displayed at the next use of the terminal.

All of the above principles allow the application selection through contactless interface (that allows user interaction on the PoS terminal or reader) even if the mobile terminal is unable to interact with the user (via its own display and keyboard) because of low power.

Another example of implementation on the concepts herein would be at the movie theater. When the user arrives at the movie theater, he may place his mobile phone near a contactless terminal (such as an automatic ticket machine, electronic transaction kiosk, PoS terminal, etc.). Doing so would allow the user to purchase movie tickets, get access to trailers for upcoming movies, use points for membership benefits, and the like. As such, the user may receive various types of information from the PoS terminal (or the like), and also be able to send information to the PoS terminal (or the like).

Figure 8:
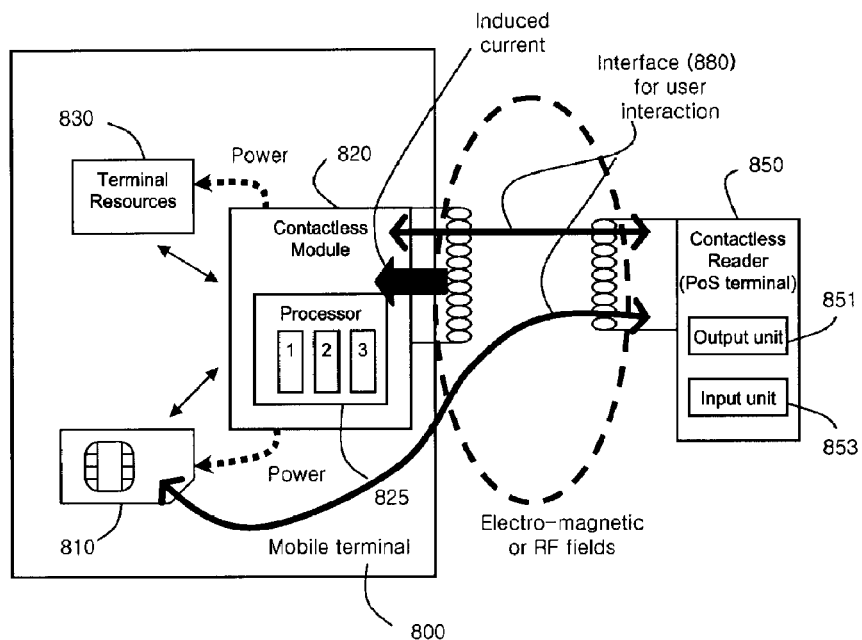
FIG. 8 shows an exemplary structure of a contactless module with various components that cooperate with an external contactless reader when battery power is insufficient.

FIG. 8 shows an exemplary structure of a mobile terminal and a contactless reader (PoS terminal) used to implement the principles of this invention.

The mobile terminal 800 and the contactless reader 850 can cooperate to perform a contactless transaction (such as making a payment, allowing transportation access, etc.) even if the battery (or other power supply) of the mobile terminal is insufficient to carry out such contactless transaction (i.e., the power level of the battery is relatively too low to properly perform the contactless transaction).

Namely, if the mobile terminal battery is found to be insufficient (i.e., too low, empty, inoperable, broken, detached, etc.), proper displaying of information on the mobile terminal screen is not possible.

For example, the battery status of the mobile terminal may be checked or verified by a control unit (such as a power management unit, a processor, etc.) to see if the battery power level falls below a certain threshold level. If the battery power level is found to be below this threshold, the control unit may set (or consider) the mobile terminal as being in insufficient operation mode. This insufficient operation mode can be the result of the mobile terminal being in battery off mode.

However, the desired information needed for executing a contactless transaction (such as making a payment by mobile phone) may be accessed by momentarily (temporarily) using a relatively small amount of power generated from current being induced from radio frequency (RF) signals or electromagnetic (EM) fields detected near the mobile terminal 800. Also, the results of the transaction can be shown on the contactless reader device 850 (such as, a PoS terminal) instead of the mobile terminal screen to allow user interaction. In other words, it shall be possible to transfer user interactions to the contactless reader (PoS terminal) as desired or if the mobile terminal is not able to process such user interactions.

In more detail, the contactless module 820 can have a processor 825 (that may have appropriate hardware and/or software modules 1, 2, 3 or the like) that can detect electromagnetic (EM) fields or radio frequency (RF) signal fields existing near the mobile terminal 800. A current induced from such detected EM or RF fields is used to access information in a smart card (UICC) 810 and/or use other terminal resources 830 within the mobile terminal 800. Such information may be outputted to the user via an output unit 851 (that can provide audible, visual, and/or tactile outputs) of the contactless reader 850, and the user can provide his inputs via an input unit 853 (that can receive audible, visual, and/or tactile user inputs) of the contactless reader 850 in order to perform the desired transaction.

As a result, an interface 880 for supporting user interaction is provided (created) between the mobile terminal 800 and the contactless reader (PoS terminal) 850. Such interface 880 may be wireless from end-to-end, and can support appropriate wireless protocols to allow information exchange. Alternatively, the interface 880 may have partially wired portions (such as an ISO communication bus) located within the mobile terminal 800. Such interface 880 may exist between the contactless reader (PoS terminal) 850 and the contactless module 820 (or the like) that communicates with the smart card 810, or between the contactless reader (PoS terminal) 850 and the smart card 810 (UICC) itself, if some or all of the contactless functions are implemented into the smart card 810.

As described thus far, the concepts and features related to contactless recharge of a mobile terminal battery can also be summed up as follows.

The present invention provides a method of contactless service for a terminal, the method comprising: transferring a user interaction to another device when the terminal is determined to be in insufficient operation mode.

The method further comprises, before the transferring step: detecting a wireless communication status; receiving a request for a transaction from the another device based upon the detecting step; and processing the transaction that requires a user interaction in the insufficient operation mode. The insufficient operation mode is determined if at least one condition among those indicating that the terminal is in battery off mode, the battery is too low, the battery is empty, the battery is inoperable, the battery is broken, and the battery is detached is satisfied. The transaction is related to at least one of financial payments, access techniques, membership programs, and loyalty programs. The request for a transaction indicates that the another device is able to perform the user interaction. The processing step is performed in battery off mode, if the another device is able to perform the user interaction. The battery off mode is when the battery power is relatively low for terminal operation or is disconnected. The transferring is performed using power induced from radio frequency (RF) field detection. The user interaction relates to user authorization using at least one of a PIN confirmation, user identification, and biometrics. The another device is a point-of-sale (PoS) reader.

Also, the present invention provides a method of contactless service with user interaction in battery off mode, the method comprising: detecting a wireless communication status; receiving a request for a transaction from another device based upon the detecting step; and transferring a user interaction related to the transaction to the another device.

The method further comprises: processing the transaction that requires the user interaction in battery off mode. Transferring is performed if the user interaction cannot be performed or is not supported by the terminal. The user interaction relates to user authorization using at least one of a PIN confirmation, user identification, and biometrics.

Additionally, the present invention provides a method of contactless service with user interaction in battery off mode, the method comprising: detecting a wireless communication status; sending a request for a transaction to a different device based upon the detecting step; and transferring a user interaction related to the transaction to the different device.

The wireless communication status is related to radio frequency (RF) signals or electromagnetic (EM) fields. The transaction is related to at least one of a contactless service, a wirelessly activated function, or a user application employing near-field communication (NFC) techniques that supports at least one of making financial payments, gaining public transportation access, user identification, user authentication, entertainment services, and personal or business activities. The user interaction is related to at least one of providing inputs and receiving outputs in a visual, audible, and/or tactile manner.

Furthermore, the present invention provides a terminal to support a method of contactless service, the terminal comprising: a secure element that supports contactless service; an interface related to the secure element to support information exchange for the contactless service; and a processor that cooperates with the secure element and the interface to transfer a user interaction for the contactless service to a different device when the terminal is in battery off mode or when the terminal has insufficient battery power.

The secure element is at least one of a smart card, UICC, and a removable memory device that supports contactless service, and the processor is related to a contactless function module that supports contactless service. The interface supports at least one of wireless protocols and wired protocols that allow the information exchange for contactless service. The user interaction is related to at least one of providing inputs and receiving outputs in a visual, audible, and/or tactile manner for contactless service.

Moreover, the present invention provides a contactless function processor to support a method of contactless service with user interaction, the entity comprising: a first module to detect a wireless communication status based on radio frequency (RF) signals or electromagnetic (EM) fields; a second module to receive a request for a transaction from a different device based upon the detection, wherein the transaction is related to at least one of a contactless service, a wirelessly activated function, or a user application employing near-field communication (NFC) techniques that supports personal or business activities; and a third module to process the transaction that requires a user interaction even if battery power is insufficient, wherein the user interaction is related to at least one of providing inputs and receiving outputs in a visual, audible, and/or tactile manner. The first, second, and third modules are implemented in a mobile terminal

INDUSTRIAL APPLICABILITY

The features and concepts herein are applicable to and can be implemented for various types of user devices (e.g., mobile terminals, handsets, wireless communication devices, etc.) and/or entities that can support different types of air interfaces, protocols, and applications used in wireless communications.

The described contactless application selection on UICC in battery off mode can be used in a wide variety of fields, such as financial applications (e.g., credit cards, ATM cards, fuel cards, etc.) service subscriptions (SIM cards for mobile phones, public transportation passes, etc.), identification applications (e.g., personal electronic ID cards, healthcare cards, etc.), security applications (e.g., biometric passports, cryptographic pass cards, employee badges, etc.), and the like.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of an application selection in a first terminal, the method performed by the first terminal and comprising:
   receiving a request for a transaction from a second terminal based upon a wireless communication status;
   selecting a battery mode of the first terminal from among a normal mode and a battery off mode according to whether a battery power of the first terminal is lower than a threshold level, wherein the battery off mode indicates that the first terminal provides part of services of the normal mode;
   performing a first application selection procedure using a first user interface of the first terminal and the battery power of the first terminal, when the normal mode is selected;
   performing a second application selection procedure using a second user interface of the second terminal and a power induced from electromagnetic fields between the first terminal and the second terminal, when the battery off mode is selected,
   wherein the second application selection procedure includes:
      transmitting, to the second terminal, first application information indicating a first application for the transaction using the power induced from electromagnetic fields, and
      receiving, from the second terminal, response information using the power induced from electromagnetic fields, the response information being acquired using the second user interface and indicating whether the first application is accepted.

2. The method of claim 1, wherein the battery off mode is determined if at least one condition among those indicating that the battery is too low, the battery is empty, the battery is inoperable, the battery is broken, and the battery is detached is satisfied.

3. The method of claim 2, wherein the transaction is related to at least one of financial payments, access techniques, membership programs, and loyalty programs.

4. The method of claim 2, wherein the request for a transaction indicates that the second terminal is able to perform the user interaction procedure with the first terminal.

5. The method of claim 1, wherein the battery off mode is when the battery power is relatively low or is disconnected.

6. The method of claim 1, wherein the second application selection procedure relates to a user authorization procedure using at least one of a PIN confirmation, user identification, and biometrics.

7. The method of claim 1, wherein the second terminal is a point-of-sale (PoS) reader.

8. The method of claim 1, wherein the transaction is related to at least one of a contactless service, a wirelessly activated function, or user application employing near-field communication (NFC) techniques that supports at least one of making financial payments, gaining public transportation access, user identification, user authentication, entertainment services, and personal or business activities.

9. The method of claim 1, wherein the second application selection procedure is related to at least one of providing inputs and receiving outputs in a visual, audible, or tactile manner.

10. A first terminal for an application selection, the first terminal comprising:
- a secure element that supports contactless service;
- an interface related to the secure element to support information exchange for the contactless service; and
- a processor which is configured to:
- receive a request for a transaction from a second terminal based upon detecting a wireless communication status;
- select a battery mode of the first terminal from among a normal mode and a battery off mode according to whether a battery power of the first terminal is lower than a threshold level, wherein the battery off mode indicates that the first terminal provides part of services of the normal mode;
- perform a first application selection procedure using a first user interface of the first terminal and the battery power of the first terminal, when the normal mode is selected; and
- perform a second application selection procedure using a second user interface of the second terminal and a power induced from electromagnetic fields between the first terminal and the second terminal, when the battery off mode is selected,
- wherein the second application selection procedure includes:
  - transmitting, to the second terminal, first application information indicating a first application for the transaction using the power induced from electromagnetic fields, and
  - receiving, from the second terminal, response information using the power induced from electromagnetic fields, the response information being acquired using the second user interface and indicating whether the first application is accepted.

11. The first terminal of claim 10, wherein the secure element is at least one of a smart card, UICC, and a removable memory device that supports contactless service, and the processor is related to a contactless function module that supports contactless service.

12. The first terminal of claim 11, wherein the interface supports at least one of wireless protocols and wired protocols that allow the information exchange for contactless service.

13. The first terminal of claim 12, wherein the user interaction is related to at least one of providing inputs and receiving outputs in a visual, audible, or tactile manner for contactless service.

14. The method of claim 1, wherein the first application is related to a first priority application or a default application.

15. The method of claim 1, wherein the second application selection procedure further comprises:
- performing the first application when the response information indicates that the first application is accepted, and
- transmitting a second application information to the second terminal using the power induced from electromagnetic fields, when the response information indicates that the first application is rejected.

16. The first terminal of claim 10, wherein the second application selection procedure further comprises:
- performing the first application when the response information indicates that the first application is accepted, and transmitting a second application information to the second terminal using the power induced from electromagnetic fields, when the response information indicates that the first application is rejected.

* * * * *